No. 833,115. PATENTED OCT. 9, 1906.
H. BELL.
VEHICLE WHEEL.
APPLICATION FILED MAY 4, 1906.
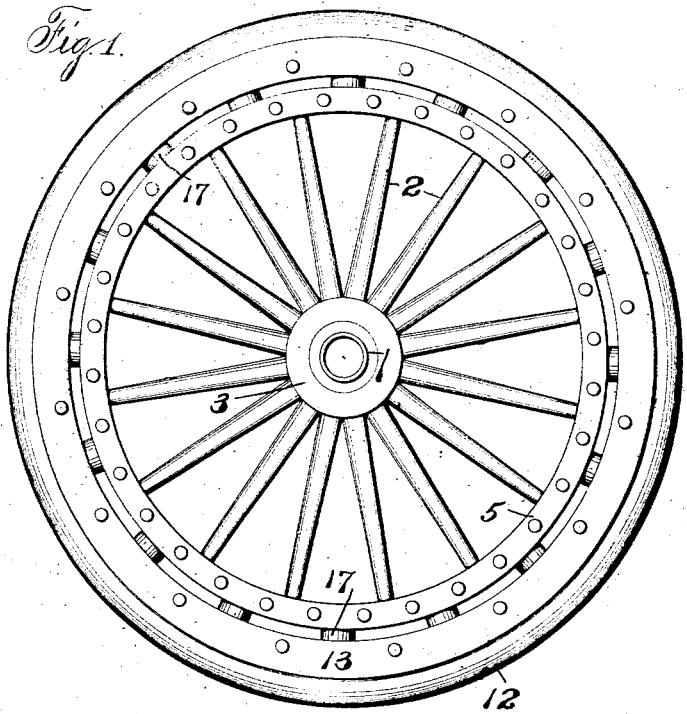
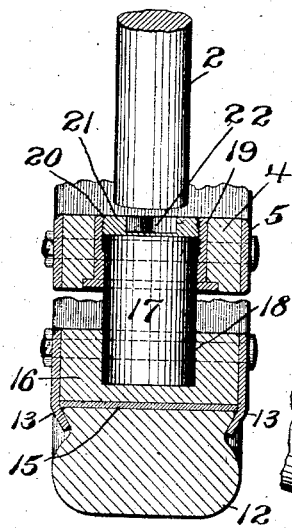
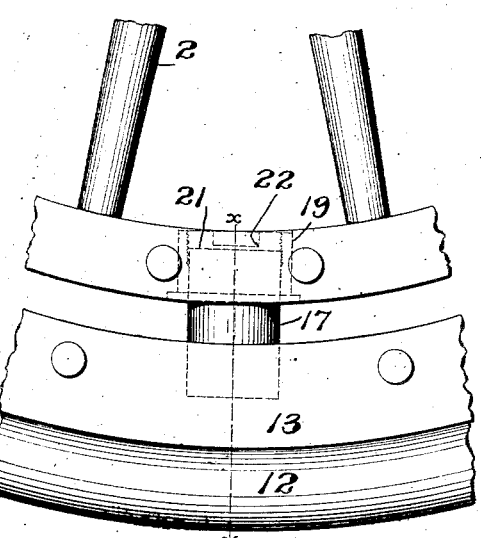
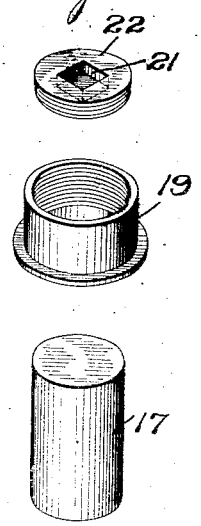
Witnesses:
Inventor,
Harry Bell
by his Att'ys

UNITED STATES PATENT OFFICE.

HARRY BELL, OF STAMFORD, CONNECTICUT.

VEHICLE-WHEEL.

No. 833,115. Specification of Letters Patent. Patented Oct. 9, 1906.

Application filed May 4, 1906. Serial No. 315,124.

*To all whom it may concern:*

Be it known that I, HARRY BELL, a citizen of the United States, residing at Stamford, county of Fairfield, and State of Connecticut, have invented certain new and useful Improvements in Vehicle-Wheels, fully described and represented in the following specification and the accompanying drawings, forming a part of the same.

The great demand for resilient vehicle-wheels is at the present time almost universally filled by providing the wheels with the well-known pneumatic tires. These tires, while giving excellent results, are objectionable, as is well known, not only on account of the great initial cost, but on account of lack of durability, because of liability to puncture and for other reasons.

The present invention has for its object to produce a comparatively inexpensive, simple, and effective wheel of the resilient type in which an outer rim is employed in connection with the felly, the rim being held in position with respect to the felly by elastic couplings introduced between it and the felly, the construction being such that the rim is effectively maintained in position against the strains incident to running, excessive movement in any direction being prevented and provision being made for readily placing the couplings in position and for removing them when made necessary by wear or for other reasons.

With this and other objects in view the invention consists in certain constructions and in certain parts, improvements, and combinations, as will be hereinafter fully described and then specifically pointed out.

In the accompanying drawings, Figure 1 is a side elevation of a wheel embodying the improved construction. Fig. 2 is a detail view, on a large scale, illustrating more particularly the construction shown in Fig. 1. Fig. 3 is a sectional view on the line x y of Fig. 2. Fig. 4 is an isometric perspective view of one of the couplings and its securing device removed from the wheel.

The wheel which has been selected to illustrate the invention is as to its general characteristics of the well-known artillery type.

The hub of the wheel is indicated at 1, the spokes at 2, and the usual spoke-holding plates at 3. The felly employed (indicated at 4) may as to its general characteristics be of any desired construction. In the best constructions, however, the felly will be held in position on the spokes by suitable retaining devices, such as circumferential rings 5, these rings being secured in place in any suitable manner—as, for instance, by bolts. The rim (indicated at 16) may be of any suitable construction and may, if desired, be provided with a solid or cushion tire, (indicated at 12,) this tire being held in position by clencher-rings 13. A metal tire (indicated at 15) may, if desired, be employed between the rim and the outer tire for the purpose of additional strength.

The outer rim and the felly will be secured together by elastic couplings. While these couplings may be of any desired form and may vary in their construction, in the best constructions and as illustrated they will consist of resilient plugs 17, the construction being such as to permit the insertion and removal of these couplings through one of the coupled parts. In order to hold these couplings in position, the rim may be provided with a series of sockets 18, into which the couplings fit. The felly may be provided with opposing sockets, which in the particular construction illustrated are shown as extending through the felly. These sockets may be formed by boring or otherwise forming holes through the rim and inserting in these holes flanged bushings 19, the lower ends of which are threaded, as shown at 20. Removable bottoms consisting of threaded stoppers 21 may be screwed into the threaded portions of the couplings, these stoppers being provided with squared sockets 22, into which the end of a wrench or other tool may be inserted.

In constructing the wheel care should be taken to so proportion the parts as to bring the outer circumference of the felly so closely to the inner circumference of the rim as to prevent the rim from yielding under sidewise strain sufficiently to pull the couplings out of their sockets. Care should also be taken not to make the couplings too resilient. A rubber composition of suitable grade is well adapted as the material for the couplings.

The construction is exceedingly simple and effective for the purpose for which it is designed. The couplings can be readily inserted, so that the wheel can be quickly assembled, and when the removable bottoms are in place the couplings are very strongly and firmly held. At the same time should any coupling become damaged it can be readily removed and replaced.

Changes and variations may be made in the construction by which the invention is carried into effect. The invention is not, therefore, to be limited to the precise construction shown and described.

What is claimed is—

1. In a vehicle-wheel, the combination with a felly, of a rim independent of the felly, a series of separate flexible couplings serving to hold the rim and felly together to permit the rim to have limited movements with respect to the felly, and means for permitting the removal of the couplings through one of the coupled parts.

2. In a vehicle-wheel, the combination with a felly, of a rim independent of the felly, a series of opposed sockets in the rim and the felly, said sockets extending through one of the parts, removable means for closing the sockets, and a series of flexible couplings located in the sockets and serving to hold the rim and felly together to permit the rim to have a limited movement with respect to the felly.

3. In a vehicle-wheel, the combination with a felly, of a rim independent of the felly, a series of separate substantially solid flexible couplings serving to hold the rim and the felly together and permitting the rim to have a limited movement with respect to the felly, and means for withdrawing said flexible couplings through one of the coupled parts.

4. In a vehicle-wheel, the combination with a felly, of a rim independent of the felly, a series of opposed sockets in the rim and felly, the sockets extending through one of the parts, a series of substantially solid flexible couplings located in the sockets, said couplings serving to hold the rim and felly together and permitting the rim to have a limited movement with respect to the felly, and means for closing the sockets.

5. In a vehicle-wheel, the combination with a felly, of a rim independent of the felly, a series of sockets in the rim, a corresponding series of opposed sockets in the felly, said sockets extending through the felly, removable bottoms for the sockets, and a series of flexible couplings located in the sockets and serving to hold the rim and felly together.

6. In a vehicle-wheel, the combination with a felly, of a rim independent of the felly, a series of sockets in the rim, a corresponding series of opposed sockets in the felly, said sockets extending through the felly, removable bottoms for these sockets, a series of substantially solid elastic plugs fitting in the sockets.

In testimony whereof I have hereunto set my hand in the presence of two subscribing witnesses.

HARRY BELL.

Witnesses:
A. WHITE,
G. GALIANI.